Oct. 17, 1939.  W. H. SILVER  2,176,363
MARKER
Filed Dec. 8, 1937  2 Sheets-Sheet 1
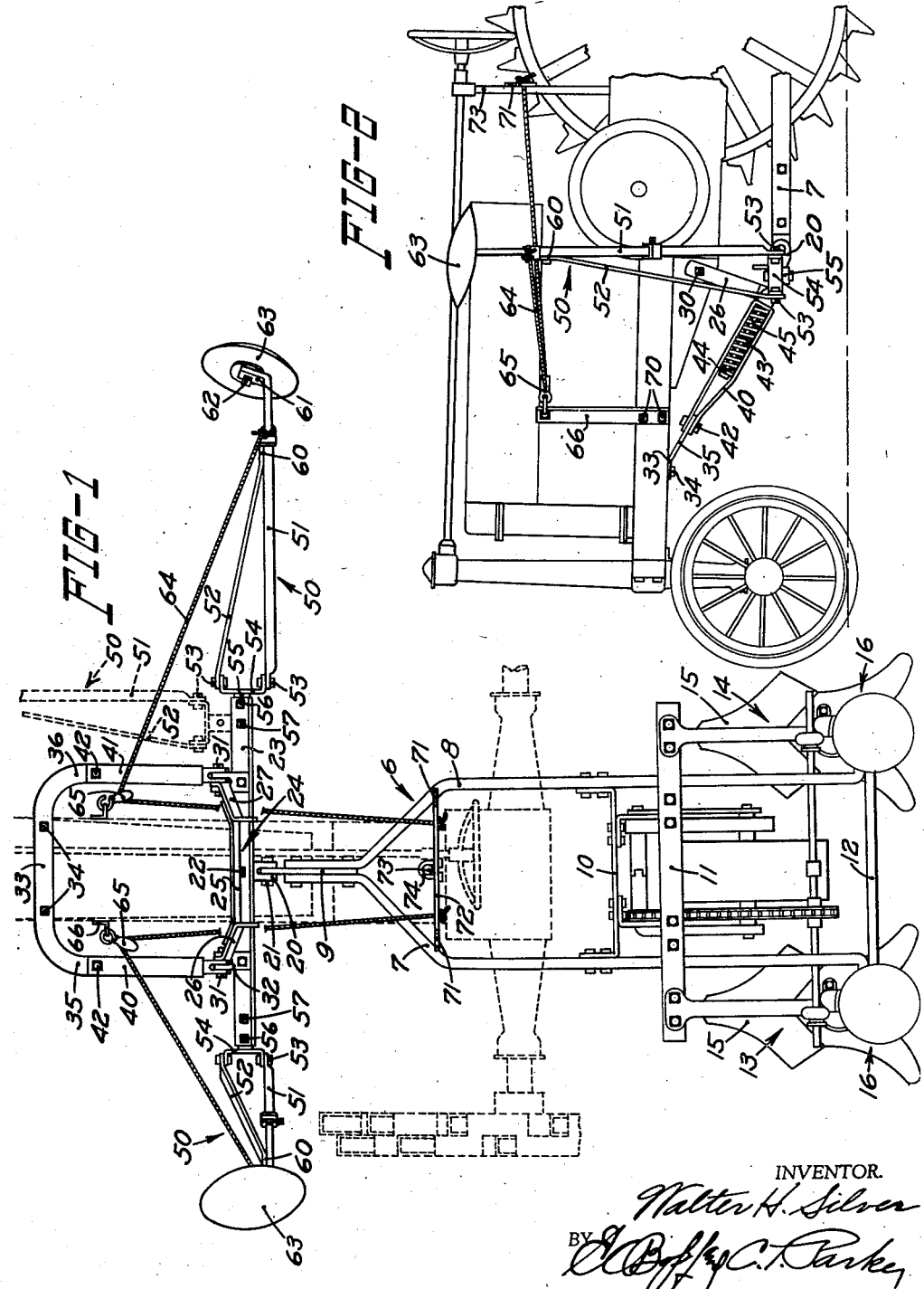
INVENTOR.
Walter H. Silver Oct. 17, 1939.   W. H. SILVER   2,176,363
MARKER
Filed Dec. 8, 1937   2 Sheets—Sheet 2
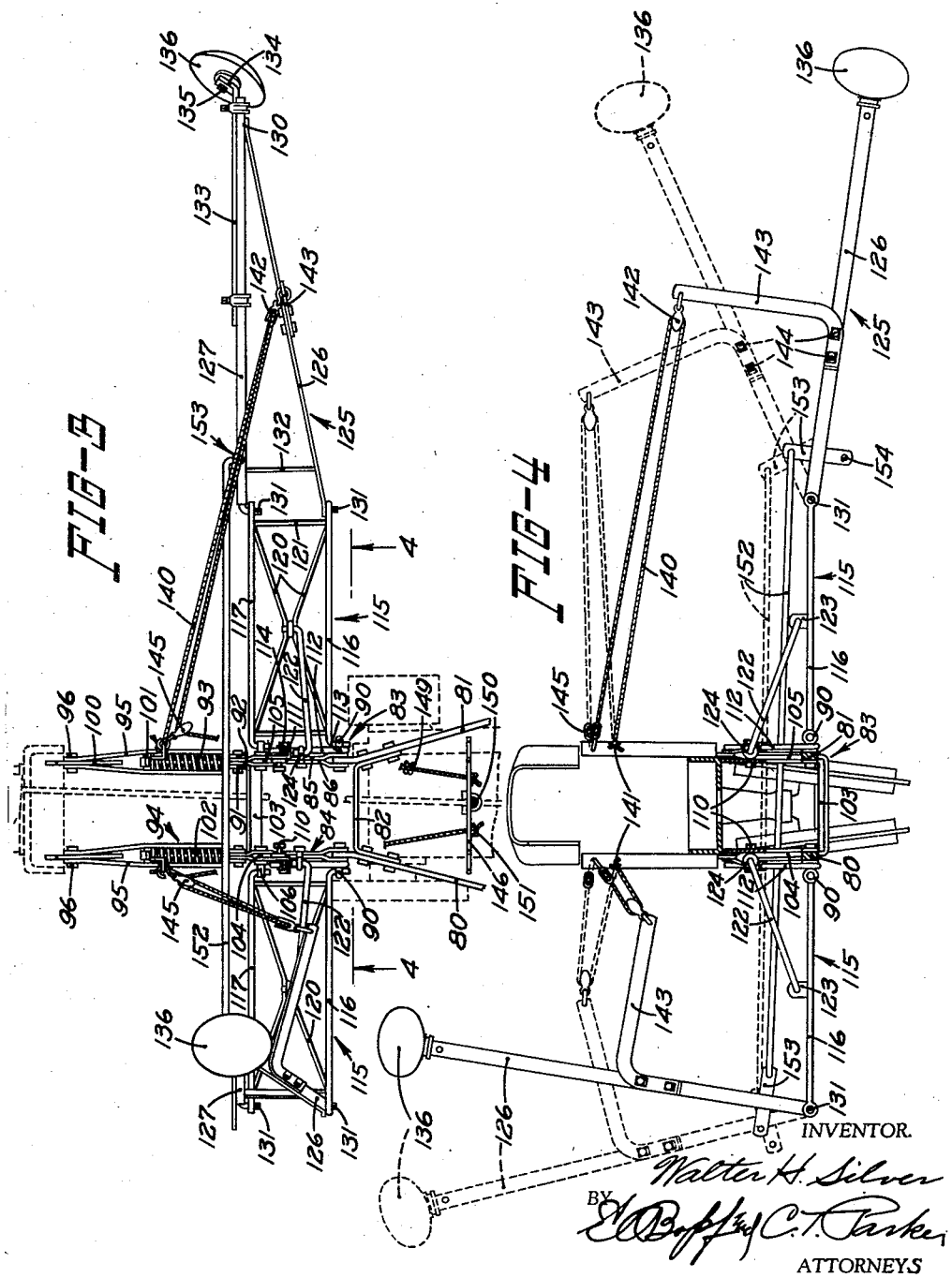
INVENTOR.
Walter H. Silver
BY
ATTORNEYS Patented Oct. 17, 1939

2,176,363

UNITED STATES PATENT OFFICE 2,176,363

MARKER

Walter H. Silver, Moline, Ill., assignor to Deere & Company, Moline, Ill., a corporation of Illinois Application December 8, 1937, Serial No. 178,744

9 Claims. (Cl. 97—230)

The present invention relates generally to agricultural implements and is specifically concerned with the provision of a marker attachment adapted to be used in conjunction with a lister or like implement of the type shown and described in my co-pending applications, Serial No. 747,261, filed October 8, 1934, and Serial No. 583, filed January 7, 1935, of which applications this is a continuation-in-part.

The principal object of the present invention is the provision of an improved marker device for attachment to the frame of a tractor mounted ground working implement whereby the marker is removed or attached with the implement. More specifically, it is the object of the present invention to provide a marker attachment which is adapted to be carried on the detachable draft frame of a tractor mounted multi-row lister.

Another object is the provision of a marker comprising a pair of marker arms movably connected to a common support on opposite sides of the tractor and interconnected by link means in such manner that lowering one of the aforesaid arms into operative position causes the other arm to be raised to inoperative position.

These and other objects and advantages of the present invention will be apparent after a consideration of the following detailed description of the preferred embodiment, taken in conjunction with the accompanying drawings, in which Figure 1 is a top plan view of a tractor mounted two-row lister with a marker illustrating the principles of the present invention, the supporting tractor being shown in broken lines;

Figure 2 is a fragmentary side elevation of the portion of the implement upon which the marker is carried, showing the near marker arm in raised or inoperative position;

Figure 3 is a fragmentary top plan view of a modified form of the marker attachment; and Figure 4 is a view taken along the line 4—4 of Figure 3, with the portion of the tractor shown in full lines.

Referring now to the drawings, particularly Figures 1 and 2, the machine there shown comprises a frame 6 made up of two laterally spaced generally longitudinally disposed beam members 7 and 8 which converge forwardly and are bolted together on opposite sides of a bar 9. The rear ends of the beams 7 and 8 are connected together by three transverse members 10, 11, and 12, forming a rigid structure on which are carried two similar lister units 13 and 14. For details of construction and operation of the lister units 13 and 14, reference may be had to my co-pending application, Serial No. 747,261, filed October 8, 1934. As the present invention is not concerned with the listers 13 and 14, it is deemed sufficient to state that each includes a furrow opener 15 and planting mechanism 16.

The bar 9 is pivotally connected to a hitch member 20 by means of a transverse pivot bolt 21 which provides for vertical swinging movement of the frame 6. The hitch member 20 is, in turn, connected by a vertical pivot bolt 22 to a transverse draft bar 23. The draft bar 23 is supported from the tractor by means of a generally vertically disposed U-shaped supporting member 24. The latter comprises a bracket 25 secured, as by riveting, at its ends to a pair of arms 26 and 27, and the upper ends of these arms are pivotally connected by means of bolts 30 (Figure 2) to the sides of the tractor. The lower ends of the arms 26 and 27 are each pivotally connected by means of a pin 31 to a bifurcated clip 32 which is fixed to the transverse draft bar 23. The draft bar 23 is further connected to the tractor by means of a yielding hitch device comprising a transverse U-shaped bar 33 which is bolted to the under side of the tractor by means of bolts 34. The ends 35 and 36 of the bar 34 are extended downwardly and rearwardly and are connected to a pair of downwardly and rearwardly extending U-shaped brackets 40 and 41 by any suitable means, such as bolts 42. The lower portion of each of said brackets 40, 41 is perforated to receive a long bolt 43, as best shown in Figure 2, and the rear end of each of these bolts is provided with a bifurcated head which is apertured to receive the pin 31 carried by the arm of the associated bracket 25 at that side of the tractor. Thus, the transverse draft bar 23 is supported on the tractor by both the supporting member 24 and the transverse bar 33. A guide 44 is connected to the forward end of each bolt 43 and adapted to engage the sides of the brackets 40, 41, as best shown in Figure 2. Between the guide 44 and the base portion of the associated bracket, is disposed a heavy compression spring 45 which embraces the bolt 43 and serves to oppose any rearward swinging movement of the supporting member 26.

For the purpose of securing straight, even and parallel rows when planting, marking means are provided, comprising a pair of markers 50, one on each side of the tractor, which are pivotally supported on the outer ends of the draft bar 23. Each of the marker arms 50 comprises a pair of angularly related bars 51, 52 which are pivotally connected at their inner ends by pivot bolts 53 to the out-turned ends of a bracket 54. Each bracket 54 is provided with an inwardly directed tongue 55 which is fixed to the under side of the draft bar 23 and rigidly secured thereto by bolts 56 and 57. The two bars 51, 52 are fixed together in any suitable manner at the point of junction 60, forming a structure braced against longitudinally directed thrust forces. The outer end of the bar 51 is bent diagonally forwardly, as at 61, and apertured to receive a spindle bolt 62 on which is journaled a marker disk 63. The marker arms as thus described, are capable of vertical swinging movement about generally longitudinally extending axes from an operating position in engagement with the ground to an inoperative position.

The marker arms 50 are raised and lowered by means of cables 64 connected near the outer ends of the bars 51, and preferably the cables pass over pulleys 65 supported on vertical bracket members 66. The latter are bolted to the tractor frame by bolts 70 and extend upwardly therefrom. From the pulleys 65, the cables 64 extend rearwardly and are adapted to be engaged in the forked ends 71 of a bracket 72 that is supported on a vertical steering wheel support post 73 by means of a U-bolt 74.

The purpose in attaching both the forward ends of the frame beams 7 and 8 and the inner ends of the marker arms 50 to the transverse draft bar 23 lies in the fact that when the implement is to be detached from the tractor, the operation of detaching the transverse draft bar itself also serves to detach the implement frame beams and the markers. To remove the entire implement, the operator has only to remove the bolts 30 and 34 which disconnects the supporting member 24 and transverse bar 33, respectively. The marker cables 64 are disengaged from the forked portions of the bracket 72, and the pulley 65 disconnected from the tractor either by removing the bolts 70 and disconnecting the bracket members 66 from the tractor, or by disconnecting the pulley from the bracket member 66 and leaving the latter attached to the tractor frame. The bolts 56 are then removed and the marker arms 50 swung forwardly into a position corresponding to that indicated in dotted lines in the upper right hand portion of Figure 1. This disposes the marker 50 between the tread lines of the rear wheels of the tractor so that the tractor may be driven forwardly free of the lister without having the wheels run over any part of the implement.

Figures 3 and 4 illustrate a modified form of marker and implement draft connection in which certain of the principles of the present invention have been embodied. Referring now to these drawings, the lister shown comprises a pair of longitudinally extending beams 80 and 81 which are connected together adjacent their forward ends by a brace member 82 and secured thereto by bolts or the like. The rear ends of the beams 80, 81 are connected together by suitable bracing members to form a rigid frame upon which are carried ground working tools and planting mechanism (not shown). The preferred embodiment of the lister structure is shown and described in detail in my co-pending application, Serial No. 583, filed January 7, 1935, to which reference may be had.

The forward ends of the beams 80 and 81 are connected to a hitch device, indicated generally by the reference numeral 83, comprising a pair of laterally spaced generally fore and aft extending links 84, each link consisting of a pair of straps 85 and 86 fixed together in any suitable manner. The rear ends of these straps are forked to receive the front ends of the beams 80 and 81 and are journaled for vertical swinging therebetween on the shanks of eye bolts 90 which are passed through aligned apertures. The forward end of each of the links 84 is swingably connected by means of a transverse pivot bolt 91 to the bifurcated head 92 of a long bolt 93 which forms a part of the resilient draft transmitting mechanism 94. Each of the mechanisms 94 includes a U-shaped bracket 95 which extends forwardly and upwardly and is pivotally connected at its forward end by a pin bolt 96 to a plate 100 which is securely fixed to the frame of the tractor. Each of the long bolts 93 is passed through an aperture in the base of its associated bracket 95 and is provided at the end thereof with a guide 101 which slidably engages the sides of the bracket 95. A compression spring 102 embraces each bolt 93 between the guide 101 and base portion of the bracket 95 and serves to oppose any rearward movement of the links 84. The hitch device 83 also includes a generally transversely disposed U-shaped member 103, the arms 104 and 105 of which extend upwardly between the straps 85 and 86 of the links 84 adjacent the front ends thereof, and are pivotally connected thereto by means of eye bolts 106. At their upper ends the arm portions 104 and 105 are pivotally connected to the sides of the tractor by means of bolts 110. The latter also serve to support angle brackets 111 which are perforated to receive the upper threaded ends of a pair of downwardly and rearwardly extending links 112, the lower end of each of which is provided with an eye portion 113 through which the shank of the eye bolt 90 is passed. Lock nuts 114 on either side of the bracket 111 hold the end of the link rigidly in place. From the foregoing description it will be seen that the links 84, the U-shaped member 103, and the links 112 serve as a triangular draft transmitting member disposed generally transversely of the tractor and swingable about an axis defined by the bolts 110, such swinging motion being resisted by the compression springs 102.

Disposed on each side of the tractor is a marker comprising a marker support 115 made up of a pair of fore and aft spaced, laterally extending members 116 and 117 connected together by means of diagonal braces 120 and cross braces 121. At their inner ends the members 116 and 117 are bent rearwardly and journaled in the eyes of the eye bolts 90 and 106. Each of the marker supports 115 is held in a laterally extending position by means of a link 122 which is pivotally connected to an apertured lug 123 fixed to the center portion of the diagonal members 120, and at their laterally inner ends, the links 122 are bent forwardly and journaled in the eyes of eye bolts 124 which are bolted to the sides of the tractor.

Supported on the outer ends of each of the marker supports 115 for vertical swinging about a generally longitudinal axis, is a marker arm indicated in its entirety by the reference numeral 125, comprising a pair of outwardly converging members 126 and 127 which are joined together and fixed, as by welding, at 130. The inner ends of the members 126 and 127 are provided with rearwardly directed pivot pins 131 which are journaled in apertures in the ends of the marker support members 116 and 117. A bracing member 132 serves to reinforce the marker arm structure. Adjustably secured to the outer end of the member 127 is a bar 133, the end of which is bent diagonally forwardly, as at 134, and apertured to receive a spindle bolt 135 on which is journaled a marking disk 136. Each arm 125 is raised and lowered by means of a cable 140 which is connected to the side of the tractor at 141 and is passed through a pulley 142 connected to the upper end of an arm 143 which is suitably fixed, as by bolts 144, to the marker arm member 126 intermediate its ends and extends at right angles thereto. From the pulley 142, the cable 140 passes through a second pulley 145 supported on the tractor and thence rearwardly to a forked bracket 146 carried on the steering wheel support post 150, with which a knot 151 in the cable 140 is engaged.

The two marker arms 125 are connected to swing together by means of a transverse link 152 which is pivotally connected at its opposite ends to brackets 153 suitably fixed to the marker arm members 127. The transverse link 152 is of such length that when one of the markers is carried in the lowered or ground engaging position, as shown in the right hand portion of Figure 4 in solid lines, the other marker arm is held up in a near vertical transport position inclined slightly toward the tractor, as shown in the left hand portion of Figure 4. An intermediate position of the marker arms 125, as illustrated in Figure 4 in broken lines, is secured by pulling the cable 140 of the operatively positioned marker arm rearwardly and engaging a second knot 149 in the forked bracket 146. In this position, the marker arm that was in ground engaging position is lifted clear of the ground, while the opposite arm is still held up in nearly vertical position but inclined outwardly instead of inwardly. The advantage of this type of connection is that it enables the operator to drive very close to fences and other obstructions and turn around at the end of the field without having the raised marker arm strike the fence or other objects. In changing from one side to the other, in which the position of the marker arms 125 is reversed, the cables of both arms are disengaged from the forked bracket 146 and the cable of the lowered arm is pulled rearwardly. As the lowered arm is raised, the connecting link 152 swings the other arm past dead center and downwardly, and the weight of the dropping arm acts to partially counterbalance the weight of the rising arm. To hold both marker arms in the raised position, the link 152 is disconnected at one end from the bracket 153 and both marker arms are pulled up by the cables 140 to the position illustrated in solid lines in the left hand portion of Figure 4. The free end of the link 152 is then reengaged with its associated bracket 153 in the aperture 154, which locks both arms in upraised position.

The implement is disconnected from the tractor by removing the pin bolts 96 and bolts 110, disengaging the links 122 from the eye bolts 124, disconnecting the link 152 at one end from the bracket 153, disengaging the marker support members 116, 117 from the eye bolts 90 and 106, respectively, and removing the pulleys 142 from the marker arm brackets 143. The marker supports 115 and all associated linkage may then be pulled to either side out of the way of the tread of the rear wheels, and the tractor driven forwardly free of the implement. Inasmuch as the ends of the marker support members 116 and 117, and the links 122 and 152 are held in place by cotter pins or other quickly removable retaining means, the disconnection of the implement may be done quickly and easily.

While I have described above the preferred structure in which the principles of the present invention have been embodied, it is to be understood that my invention is not to be limited to the details shown and described herein, and widely different means may be employed in the practice of the broader aspects of my invention.

What I claim as my invention is:

1. For use with a tractor, an implement comprising a ground working tool carrying frame, detachable means for yieldably connecting said frame to said tractor, and marker means carried on said detachable means and movable into ground engaging position spaced laterally of said frame.

2. For use with a tractor, a ground working tool carrying frame, detachable draft means mounted on the tractor for fore and aft movement with respect thereto, means for yieldingly resisting such movement, and a marker supported on said draft means and movable vertically into operative position.

3. For use with a tractor, an implement comprising a hitch device, means for yieldably connecting said hitch device with the tractor, a ground working tool carrying frame pivotally connected to said hitch device, a marker support mounted on the implement adjacent the point of pivotal connection of said frame with said hitch device, a marker arm pivotally connected with said support for vertical swinging between operative and inoperative positions, and means for raising and lowering the marker arm.

4. The combination with a tractor, of an implement comprising a hitch device mounted on the tractor, a ground working tool beam extending longitudinally of the tractor and pivotally connected at its front end to said device for vertical swinging with respect to the tractor, a marker support pivotally connected with said implement adjacent the point of pivotal connection of said beam with said hitch device, a marker arm pivotally connected with said support for vertical swinging, means on the tractor connected with said marker arm for raising and lowering the latter, and means for maintaining said support in a laterally extending position.

5. The combination with a tractor, of an implement comprising a hitch device mounted on the tractor for fore and aft movement with respect to the tractor, means for yieldingly resisting such movement, a ground working tool beam extending longitudinally of the tractor and pivotally connected at its front end to said device for vertical swinging with respect to the tractor, a marker support pivotally connected to said implement adjacent the point of pivotal connection of said beam with said hitch device, a marker arm pivotally connected to said support for vertical swinging, means on the tractor and connected with said marker arm for raising and lowering said marker arm, and means for maintaining said support in a laterally extending position.

6. The combination with a tractor, of an implement comprising a hitch device mounted on the tractor for fore and aft movement with respect to the tractor, means for yieldingly resisting such movement, a ground working tool beam extending longitudinally of the tractor and pivotally connected at its front end to said device for vertical swinging with respect to the tractor, a marker support pivotally connected to said device, a marker arm pivotally connected to the outer end of said support for vertical swinging, a connection extending between said support and the tractor for maintaining said support in laterally extended position, and means on the tractor and connected with said marker arm for raising and lowering said marker arm.

7. The combination with a tractor, of an implement comprising a hitch device supported on the tractor, a ground working tool beam extending longitudinally of the tractor and pivotally connected at its forward end to said device for vertical swinging with respect to the tractor, a pair of markers extending laterally outwardly of the tractor at opposite sides thereof and pivotally connected at fore and aft spaced points with said hitch device, and a link serving to directly connect the marker at one side with the marker at the other side and acting against the marker in operating position for holding the opposite marker in its inoperative position.

8. The combination with a tractor, of an implement comprising a hitch device supported on the tractor, a ground working tool beam extending longitudinally of the tractor and pivotally connected at its forward end to said device for vertical swinging with respect to the tractor, a pair of marker arms disposed at each side of the tractor, means serving to pivotally connect said marker arms with said hitch device to provide for swinging the marker arms vertically into and out of operating position, and a transversely disposed link pivotally connected with each of said marker arms, the pivot connections between said link and said arms with respect to the pivot connections between the arms and the tractor being such that the marker arm in operating position serves to hold the opposite marker arm in its inoperative position and movement of the marker arm in operating position upwardly a relatively small amount but out of engagement with the ground will not shift the opposite marker arm appreciably towards its operating position.

9. The combination with a tractor, of an implement comprising a hitch device disposed beneath the tractor body, means for yieldably connecting said hitch device with the tractor near the forward end thereof, a tool carrying member connected to said hitch device and extending rearwardly therefrom, said tool carrying member having a ground working tool disposed to the rear of the tractor, a pair of markers extending laterally outwardly of the tractor at opposite sides thereof and pivotally connected to said hitch device for vertical swinging, and means serving to directly connect the marker at one side with the marker at the other side and acting against the marker in operating position for holding the opposite marker in inoperative position.

WALTER H. SILVER.